United States Patent [19]

Juri et al.

[11] Patent Number: 5,193,010
[45] Date of Patent: Mar. 9, 1993

[54] DIGITAL VIDEO SIGNAL RECORDING AND REPRODUCING APPARATUS HAVING AN ERROR CONCEALMENT CONTROL FUNCTION

[75] Inventors: Tatsuro Juri, Osaka; Chiyoko Matsumi, Suita; Shinya Kadono, Hirakata; Hideki Ohtaka, Neyagawa, all of Japan

[73] Assignee: Matsushita Electric Industrial Co., Ltd., Osaka, Japan

[21] Appl. No.: 574,288

[22] Filed: Aug. 28, 1990

[30] Foreign Application Priority Data

Aug. 29, 1989 [JP] Japan .................. 1-221978
Jun. 29, 1990 [JP] Japan .................. 2-173429

[51] Int. Cl.$^5$ .................. H04N 5/94; H04N 5/78
[52] U.S. Cl. .................. 358/336; 360/38.1
[58] Field of Search ............ 358/133, 135, 335, 339, 358/310, 327, 13, 342, 336, 314; 360/32, 33.1, 38.1, 15, 39, 40, 48, 36.2, 45, 49

[56] References Cited

U.S. PATENT DOCUMENTS

| | | | |
|---|---|---|---|
| 4,807,033 | 2/1989 | Keesen et al. | 358/167 |
| 4,829,522 | 5/1989 | Nishiguchi | 360/38.1 |
| 4,963,992 | 10/1990 | Doi et al. | 360/33.1 |
| 5,045,955 | 9/1991 | Ikeda | 358/335 |

FOREIGN PATENT DOCUMENTS

| | | |
|---|---|---|
| 0126593 | 11/1984 | European Pat. Off. . |
| 63-067036 | 3/1988 | Japan . |
| 87/02210 | 4/1987 | PCT Int'l Appl. . |
| 2226927 | 7/1990 | United Kingdom . |

Primary Examiner—Andrew L. Sniezek
Assistant Examiner—Nabil Hindi
Attorney, Agent, or Firm—Wenderoth, Lind & Ponack

[57] ABSTRACT

In recording and reproducing the digital video signals by bit rate reduction, if they are copied while being subjected to bit rate reduction, no accumulation of distortions in orthogonal transformation or bit rate reduction occurs, and moreover, copying can be done at a low data rate. On the other hand, in case of dividing the data into blocks in each page and transmitting or recording and reproducing the data by block, by concealing the error by the data having the strongest correlation out of the data located in the pages before and after the block in which error has been detected, no degradation in image quality is induced even when the scene changes between pages. Further, at the same time, by detecting the previous concealment information, if there exists a block which was previously concealed in the block in which error has at present been detected, then the data can be fully reproduced by utilizing it, and degradation in image quality can be reduced to a minimum. Also, if degradation in image quality is reduced to a minimum, then the degradation in image quality in the case of repeated copying is reduced to a minimum.

30 Claims, 8 Drawing Sheets

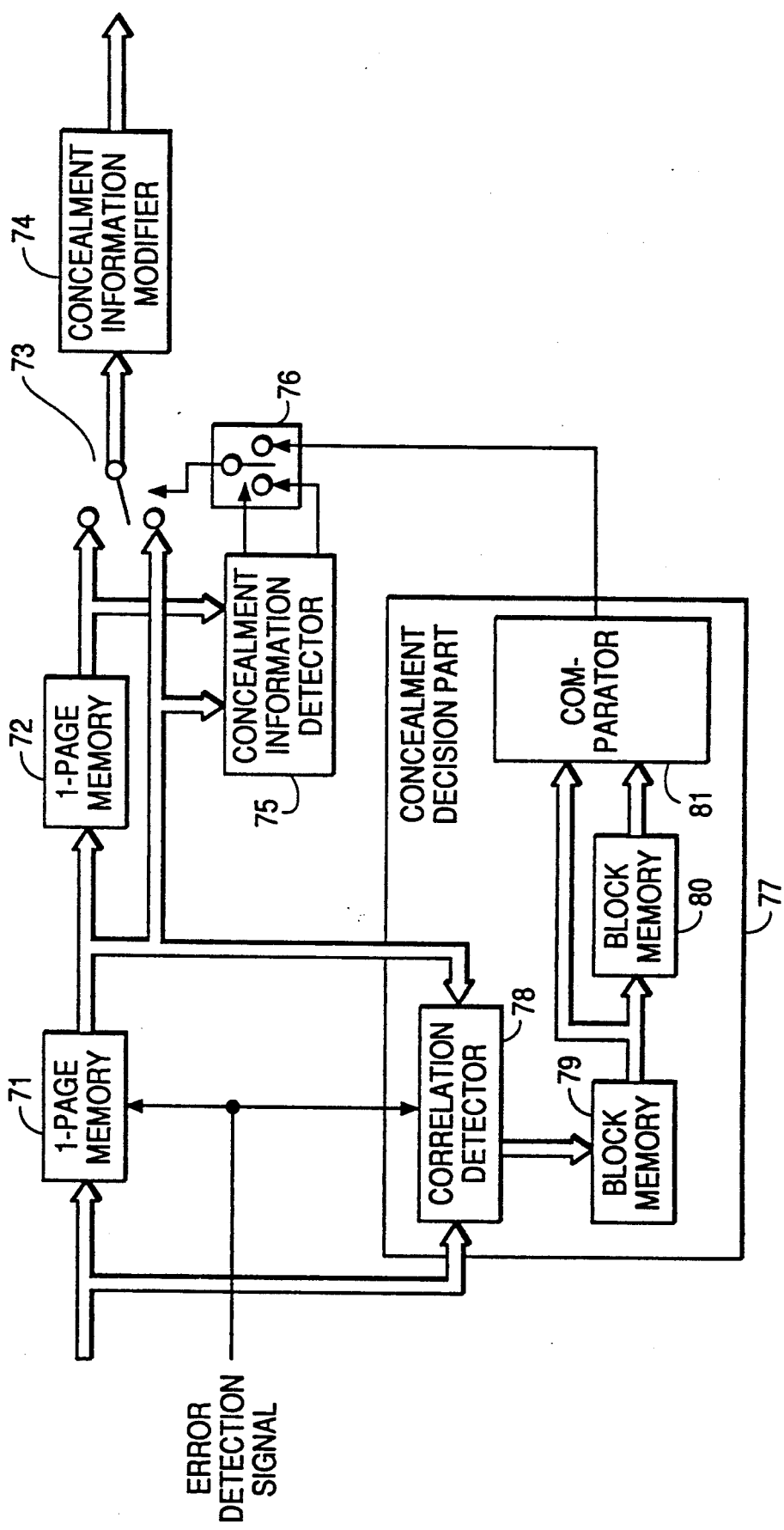

DIGITAL VIDEO SIGNAL RECORDING AND REPRODUCING APPARATUS HAVING AN ERROR CONCEALMENT CONTROL FUNCTION

BACKGROUND OF THE INVENTION

1. Field of the Invention

The present invention relates to an apparatus for recording and reproducing digital video signals after bit rate reduction.

2. Description of the Prior Art

In a conventional digital audio apparatus or digital video apparatus, copying has been performed by using the audio signals or video signals after converting them to digital signals. What provides the greatest problem in recording and reproducing the digital signals is the fact that the data amount thereof is very large. To meet this problem, various bit rate reduction systems have been proposed, and recording and reproducing apparatuses using bit rate reduction have been in development. As an example of the bit rate reduction, there is a system based on variable length coding of the components obtained by subjecting the objective signal to an orthogonal transformation. In the orthogonal transformation and the inverse orthogonal transformation, errors arise which are caused by rounding in view of the number of digits used for operation thereof and the number output digits. For example, in the 8×8 Hadamard transformation, when the accuracy of the input is 8 bits, the accuracy of the output is 14 bits, but what is actually used for bit rate reduction is the upper 9–10 bits. Also, in the 8×8 discrete cosine transformation (normally abbreviated as DCT), even when the accuracy of the input is 8 bits and the accuracy of the output coefficient is more than 16 bits, what is used for the bit rate reduction is about the upper 10 bits. Moreover, the real value of the coefficient is an irrational number. In the copying method as above, due to the repetition of the inverse orthogonal transformation of the reproduction of the copy output and the orthogonal transformation of the recording of the copy input on each copying, there is a problem of an accumulation of distortion.

Also, as the video signals are in general transmitted or recorded by dividing data into specified blocks, with respect to the errors which occurred at the channel, the errors could be detected in block units but could not be corrected. In the conventional practice, replacement was made by a block which is 1 page (1 page represents one field or plural fields) before that of the related block for concealment. As the video signal has an extremely large inter-page correlation, it was possible to reproduce efficiently the blocks with which the errors were detected by such concealment. However, in the constitution as above, when the scene changes from that of one page before, due to the decrease of the inter-page correlation, there is a possibility for a large degradation to occur by concealment. Also, in case of an increase in the blocks in which only detection of the errors that occurred as a result of the repetition of transmission or recording was effected, there occurred blocks which were further concealed by using the concealed blocks, thereby incurring a large degradation of the image quality in the rapidly moving video signals.

SUMMARY OF THE INVENTION

An object of the present invention is to provide a digital video signal recorder and reproducer in which it is possible to reduce degradation in image quality accumulated in the case of repetition of copying to a minimum and to suppress degradation in image quality by concealment in the normal reproduction of the digital video signals which were subjected to bit rate reduction.

In an aspect of the invention, in case of the recording and reproducing the present digital video signals which have been subjected to bit rate reduction, by outputting the error concealed signal as a digital copy signal on the reproducing-side apparatus and inputting the digital copy signal as an input on the recording-side apparatus, copying is performed with bit rate reduction. Since the copying is free from the accumulation of the distortion in orthogonal transformation or bit rate reduction, copying can be repeated without causing degradation in the image quality. Furthermore, since signals subjected to bit rate reduction are used, it is possible to perform copying at a low data rate.

In another aspect of the present invention, in transmitting or recording the digital video signals such that one page is constituted by one field or a plurality of fields and the data is subjected to intra-page division to form blocks, a judgement is made as to which of the data in the reference block located in the same position one page before or the data in the reference block located in the same position one page after has the stronger correlation with the data of the block in which an error has been detected due to a transmission error or the like, and the block in which the error has been detected is replaced by the reference block having the stronger correlation. By this procedure, even in inter-page changes of scene, no degradation in image quality occurs and the degradation in image quality can be reduced to a minimum.

In still another aspect of the present invention, in transmitting or recording the digital video signals such that one page is constituted by one field or a plurality of fields and such that the data is subjected to intra-page division to form blocks and added to the concealment information, with respect to the block in which an error has been detected, the concealment information in the reference block located in the same position one page before said block and the concealment information in the reference block located in the same position one page after said block are checked, and when there exists a block which was previously replaced and in which the error is at present detected, concealment is performed with said block. This provides a greater possibility for perfect reproduction of the data in the block with which an error has been detected, thereby making it possible to reduce the degradation in image quality by concealment to a minimum. Also, by reducing the degradation in image quality by concealment to the minimum, degradation in image quality in the case of repeated copying also can be reduced to a minimum.

BRIEF DESCRIPTION OF THE DRAWINGS

FIGS. 5(a) and 5(b) are block diagrams of other examples a concealment part of the circuit of FIG. 2;

DESCRIPTION OF THE PREFERRED EMBODIMENTS

Figure 1:
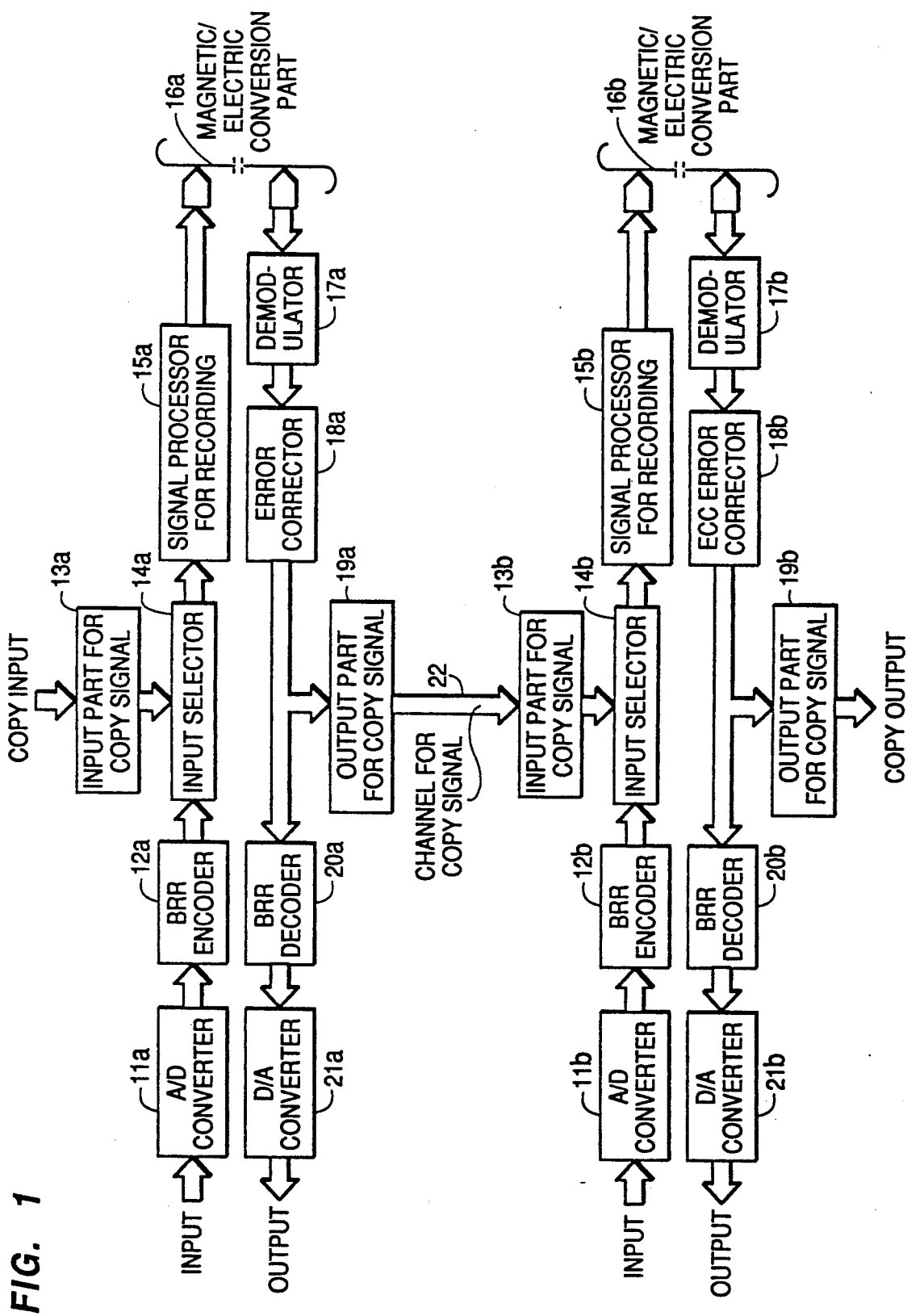
FIG. 1 is a block diagram of an example of a circuit for realizing the present invention.

FIG. 1 is a block diagram of a digital video signal recorder and reproducer in accordance with a first embodiment of the present invention, in which the elements 11a and 11b are A/D converters, and elements 12a and 12b are bit rate reduction encoders (hereinafter referred to as BRR encoders). Elements 13a and 13b are input parts for copy signal; elements 14a and 14b are input selectors; elements 15a and 15b are signal processors for recording; elements 16a and 16b are magnetic/electric conversion parts (magnetic head and magnetic recording medium); elements 17a and 17b are demodulators; elements 18a and 18b are error correctors; elements 19a and 19b are output parts for copy signal; elements 20a and 20b are bit rate reduction decoders (hereinafter referred to as BRR decoders); elements and element 21b are D/A converters, and 22 is channel for copy signal.

In the digital signal recorder and reproducer constituted as above, the inputted signal is subjected to A/D conversion by the A/D converter 11a, and bit rate reduction encoding by the BRR encoder 12a. In normal recording, the signal from the BRR encoder 12a, and in copy recording, the signal from the input part for copy signal 13a, is selected by the input selector 14a. The output signal of the input selector 14a is subjected to signal processings such as error correction encoding, modulation, etc. by the signal processor for recording 15a, and thereafter recorded on the magnetic/electric conversion part 16a. The data reproduced from the magnetic/electric conversion part 16a is demodulated by the demodulator 17a, and the signal obtained by correcting with the error corrector 18a is outputted from the output part for copy signal 19a as a copy signal. In obtaining the ultimate output, the signal is subjected to bit rate reduction encoding by the BRR decoder 20a and the signal subjected to D/A conversion by the D/A converter 21a is outputted. In copying, the signal to be copied is outputted from the output part for copy signal 19a and is inputted to the input part for copy signal 13b through the channel for copy signal 22. Either the input signal to be copied or the output from BRR encoder 12b is selected by the input selector 14b. The selected signal is subjected to processings such as error correction encoding, modulation, etc. with the signal processor for recording 15b, and recorded on the magnetic/electric conversion part 16b.

As described above, according to this embodiment, the frequency of encoding in bit rate reduction is only once at the initial recording, irrespective of the frequency of the subsequent copying. The frequency of decoding in bit rate reduction is also only once at the final outputting. Accordingly, the distortion occurring in orthogonal transformation and bit rate reduction is not accumulated.

Figure 2:
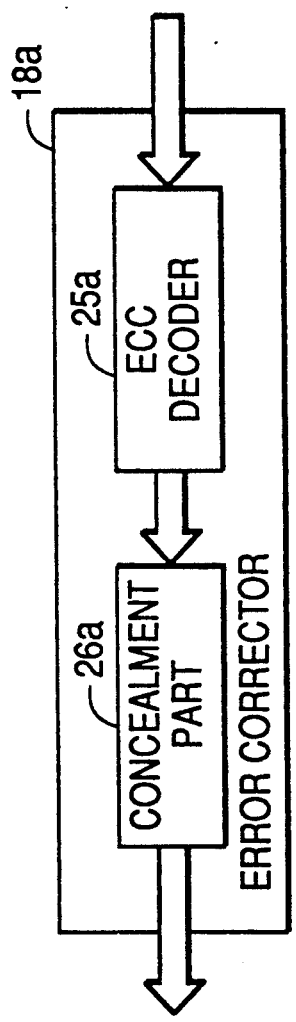
FIG. 2 is a block diagram of an example of an error corrector of the circuit of FIG. 1.

In the second embodiment of the present invention, as shown in FIG. 2, the error corrector 18a is divided into two parts consisting of an error correcting code decoder (hereinafter referred to as an ECC decoder) 25a and a concealment part 26a. Similarly, the error corrector 18b also can be divided into two parts. In the ECC decoder 25a, the correctable errors are corrected, and uncorrectable errors are only detected and flags showing the detection of errors are added. In the concealment part 26a, the errors are concealed based on the flags.

Figure 3:
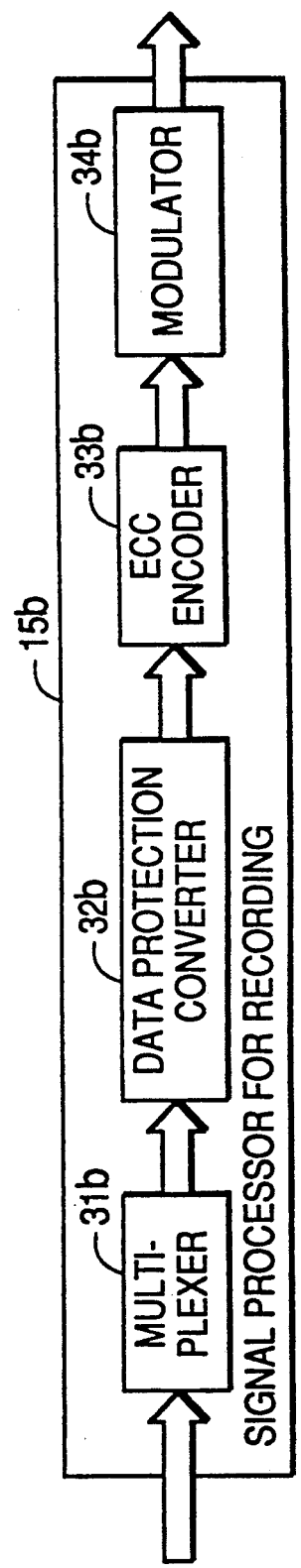
FIG. 3 is a block diagram of the recorded signal processor for recording of the circuit of FIG. 1.

In the third embodiment of the present invention, as shown in FIG. 3, the signal processor for recording 15b is divided into a multiplexer 31b for multiplexing the video signal which has been subjected to bit rate reduction encoding and other auxiliary data, a data protection converter 32b, an error correcting code encoder (hereinafter referred to as an ECC encoder) 33b, and a modulator 34b. The signal processor for recording 15a is similar in its internal configuration to the signal processor 15b. In the case of a VCR, the auxiliary data includes information explaining the video signal (e.g., title, recording date and time, character information, etc.), information explaining the format of the video signal (e.g., 525 line-60 Hz/625 line-50 Hz system, sampling frequency, still picture, etc.), information related to the recorded state (e.g., copy permission, encryption, generation of copy and editing, time code, table of contents, etc.), and further concealment information (which shows whether each block is a concealed block or not, and by which block each concealed block has been replaced). The auxiliary data are multiplexed with the bit rate reduction encoded video signal and recorded. Accordingly, in a copy mode in which the encoded video signal is transferred form the output part for copy signal 19a of one apparatus to the input part for copy signal 13b of another apparatus and copied, the auxiliary data are also transferred from the output part for copy signal 19a of one apparatus to the input part for copy signal 13b of another apparatus. With the multiplexer 31b, some parts of the auxiliary data such as the information related to the recorded state and the information explaining the video signal are modified and the other parts of the auxiliary data are recorded as is. With respect to the concealment information, modification is performed with the concealment part 26a, so that no alternation is performed with the multiplexer 31b. Also, in case of recording the output signal from the BRR encoder 12b, the multiplexer 31b sets the auxiliary data so as to specify the recording signal.

On the other hand, in such an apparatus that carries out altering of the protection state of the inputted signal from the encrypted state to the non-encrypted state and vie versa or that uses an encrypting key such as a password in carrying out encryption, the alteration of the encrypting key for carrying out copying is performed by the data protection converter 32b, and the alteration of the auxiliary data which is necessary as a result of alteration of the state of protection is performed by the multiplexer 31b.

The fourth embodiment of the present invention is necessary when there is a possibility for the errors to occur in the communication channel for copy signal 22, where an encoding of an error correcting code is carried out in the output part for copy signal 19a, and the decoding thereof is carried out in the input part for copy signal 13b to correct the errors which occurred in the channel for copy signal 22. Also, according to necessity, the input part for copy signal 13b may be provided with a function to request the output part for copy signal 19a for re-transmission of data.

The block configuration in the abovementioned embodiments is merely an example. Even by a different configuration, it is possible to carry out copying by a similar method.

In the bit rate reduction, in general, a video signal in one page is divided by a rectangular parallelepiped formed of a three dimension space consisting of the horizontal, vertical and time direction (when 1 page is 1 field, this becomes a rectangle), and, based on the rectangular parallelepiped or rectangle being one unit, using an orthogonal transformation or other transformation similar thereto, a DC coefficient (a DC component or the lowest frequency component) and AC coefficients are obtained. The DC coefficient is a value corresponding to the average of the total video pixel values which constitute the unit, and is usually important. AC coefficient values are used for bit rate reduction by utilizing the fact that they are distributed in a narrow range. Here, there is a method for bit rate reduction (BRR) encoding by collecting the rectangular parallelepipeds of plural units into one block to carry out BRR encoding. In this case, the whole screen in one page or an optionally divided part of the screen of one page, having the rectangular parallelepiped of one unit as the minimum unit is rearranged, and the rectangular parallelepipeds of an optional number of units are combined to make 1 block.

Figure 4A:
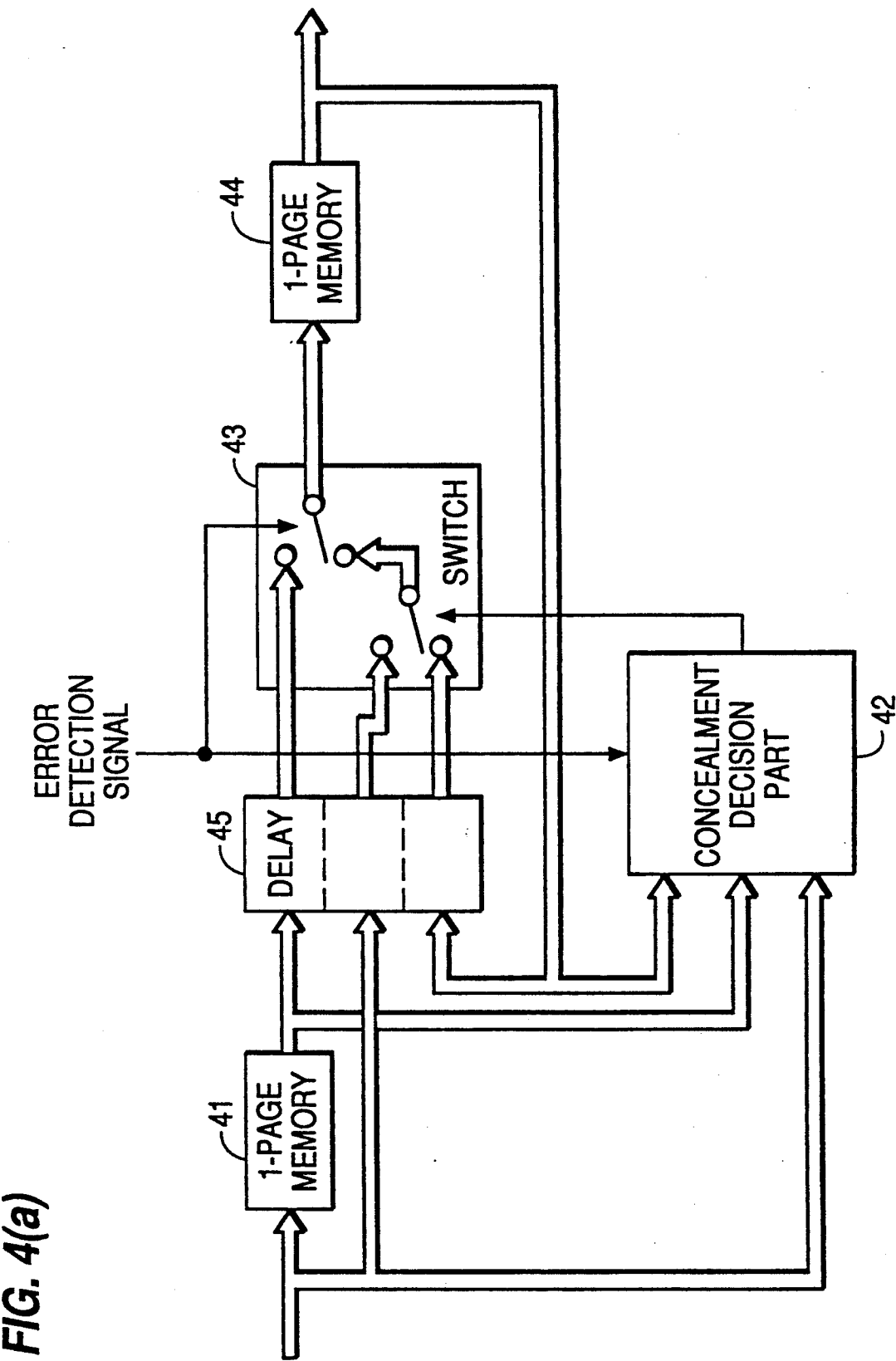
FIGS. 4(a) and 4(b) are block diagrams of examples of a concealment part of the circuit of FIG. 2.

FIG. 4(a) is a block diagram of an error concealment part 26a in accordance with the fifth embodiment of the present invention, in which the elements 41 and 44 are 1-page memories each having capacity of storing 1 page of data; element 42 is a concealment decision part; element 43 is a switch, and element 45 is a delay. The operation of the fifth embodiment is explained hereafter. A block which has been transmitted or recorded and reproduced is first inputted to the 1-page memory 41. In the concealment decision part 42, the block outputted from the 1-page memory 41, when an error is detected in the block, is subjected to a determination as to whether the data in the reference block one page after that to be inputted or the data in the reference block one page before that to be outputted from the 1-page memory 44 has the strongest correlation to the data of the block. In the switch 43, when no error has been detected, the output of the 1-page memory 41 is selected, and when an error has been detected, the reference block of the page selected by the concealment decision part 42 is selected. The block selected with the switch 43 is outputted via the 1-page memory 44. In general, as there are in fact a large number of non-erroneous data in the block in which errors have been detected, the data in the block in which errors have been detected can be utilized in the concealment decision part 42. By comparing the data in the block one page before from the 1-page memory 44 and the data to be inputted in one page later with the data in the block with which the error from the 1-page memory 41 has been detected to select the block in which there are a large number of the close data, the block having the strongest correlation can be selected. For comparison of data, the difference of the DC coefficients of the parallelepiped which is a unit of the bit rate reduction is taken between the block with which the error has been detected and each reference block, and, based on the respective absolute values, a correlation detection operation is carried out by one block. A method of obtaining the sum of the absolute values of the differences of the DC coefficients by one block respectively is the simplest way. While the operation is carried out at the concealment detection part 42, the respective data are delayed in block units by the delay 45.

Figure 4B:
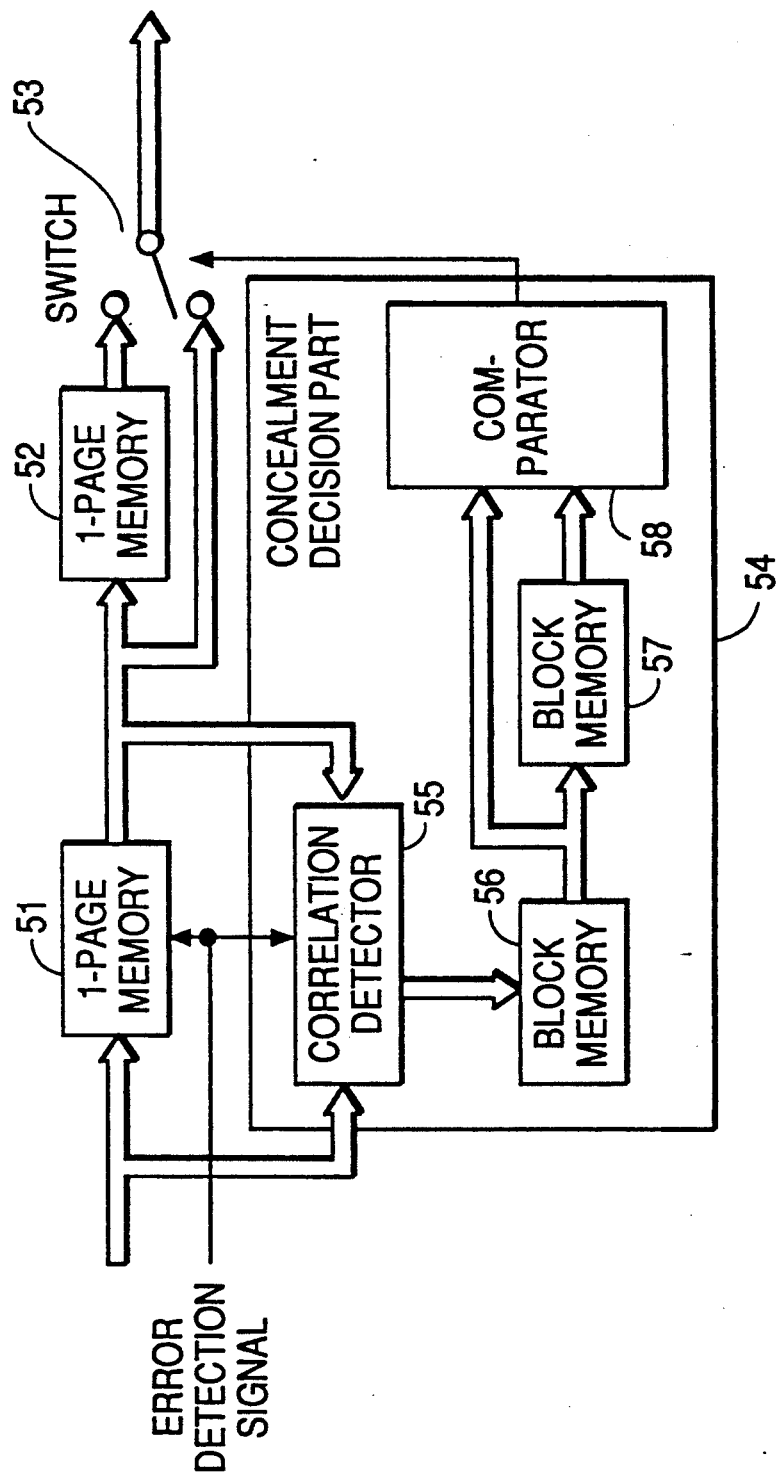

FIG. 4(b) is a block diagram of a concealment part 26a in accordance with the sixth embodiment of the present invention, in which the elements 51 and 52 are 1-page memories; 53 is a switch, 54 is a concealment decision part; 55 is a correlation detector, 56 and 57 are each a block memory, and element 58 is a comparator. The block which has been transmitted or recorded and reproduced is first inputted to the 1-page memory 51. At this time, by selecting the block in which an error has been detected to 'write-inhibit' state, the signal concealed by the reference block one page before is written in the 1-page memory 51. This signal is further transferred to the 1-page memory 52. To the block which is judged by the concealment decision part 54 to be better for concealment made by the reference block one page later than by the reference block one page before out of the blocks in which errors were detected, the signal from the 1-page memory 51 is selected by using the switch 53. Also, to the block in which no error has been detected or the block which is judged by the concealment decision part 54 to be better for concealment made by the reference block one page before, the signal from the 1-page memory 52 is selected by using the switch 53. In the concealment decision part 54, the difference of the DC coefficient of the parallelepiped which is a unit of the bit rate reduction is taken between the signal from the 1-page memory 51 and the signal to be inputted, and, based on the respective absolute values, a correlation detection operation is carried out by one block with the correlation detector 55. However, if an error has been detected with either block, the related information is written in the block memory 56. As to the operation to obtain the correlation information, a method of obtaining the average of the absolute values of the differences of the DC coefficients by one block is the simplest way. The results thereof are written in the block memory 56 by block, and transferred to the block memory 57 on a page by page basis. In the comparator 58, the correlated information of the block near the block in which errors have been detected and the block near the reference block one page before it is read out from the block memory 57, and the correlated information of the block near the block in which errors have been detected and the block near the reference block one page after it is read out from the block memory 56, and the respective correlated information is subjected to operation in consideration of the distance from the block in which the error has been detected, by which a judgement is made as to with which reference block has the strongest correlation. However, as to the operation, the method of obtaining the average of the correlated information is the simplest.

In the video signal, the data which are mutually near in space have a strong correlation. Accordingly, when judgement is made on the data in the block lying near the block in which the error has been detected (e.g., the adjacent block) as to which of the blocks near the reference block one page before the block in which the error has been detected and the reference block one page after it, respectively, it becomes possible to select the reference block which has the strongest correlation with the block in which the error has been detected.

On the other hand, in case of utilizing the data of all the blocks in the page in which there are the blocks in which the errors have been detected, an operation to obtain the correlated information to be carried out with the correlation detector 55 is carried out on a page by page basis. However, if an error has been detected in either of the blocks, the blocks are not to be used. With respect to the operation to obtain the correlated information, the method of obtaining the average of the absolute values of the difference of DC coefficients by one block is the simplest. The result of said operation is written in the block memory 56 as the correlated information and transferred to the block memory 57 by page. Here, the block memories 56 and 57 may be D-FF, i.e. - D type flip-flops, whose number is sufficient for one operation result. In the comparator 58, the correlated information between the page in which the error has been detected and the page before it is read out from the block memory 57, and the correlated information between the page in which the error has been detected and the page after it is read out from the block memory 56, and judgement is made as to which reference block has the strongest correlation. In the case of the scene change, as there is correlation on only either one of the screen one page before or one page after over all of the pages, it becomes possible to select more accurately the page having the strongest correlation by judging the concealment method in page units.

Figure 5A:
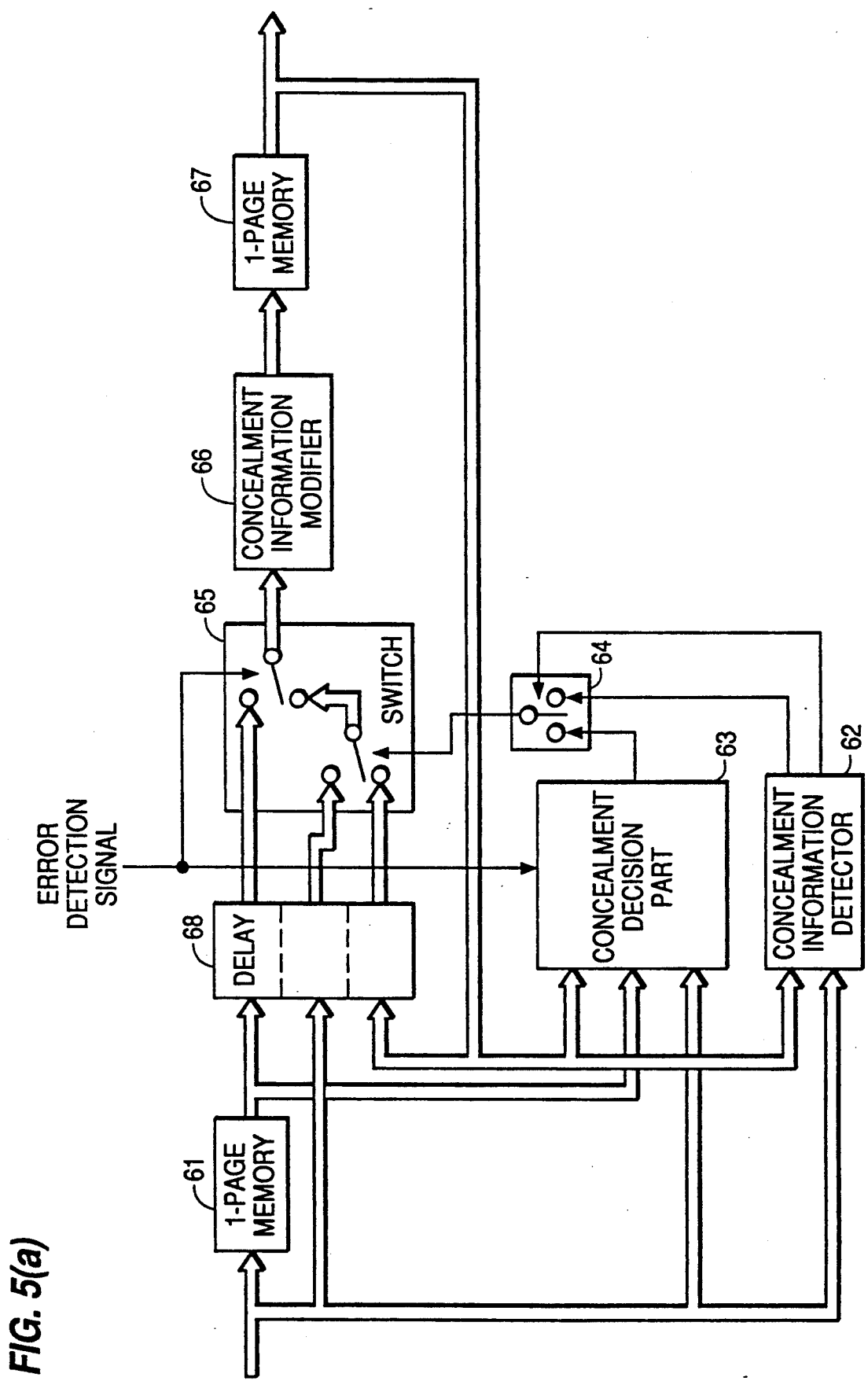

FIG. 5(a) is a block diagram of an error concealment part 26a in accordance with another embodiment of the present invention, in which elements 61 and 67 are 1-page memories; element 62 is a concealment information detector; element 63 is a concealment decision part; element 64 is a first switch; element 65 is a second switch, element 66 is a concealment information modifier, and element 68 is a delay. The operation of the seventh embodiment is explained hereafter. The block which has been transmitted or recorded and reproduced is first inputted to the 1-page memory 61. In the concealment information detector 62, the concealment information of the reference block one page after that to be inputted and the concealment information of the reference block one page before that outputted from the 1-page memory 67 are detected, and search is performed as to whether those reference blocks were previously concealed by the data in the block which is presently in process. In the block outputted from the 1-page memory 61, when no error has been detected, the said block is selected by the second switch 65. When an error has been detected in this block, by the information outputted from the concealment information detector 62, if there is a block previously concealed with this block (e.g. - a reference block which is either one page before or one page after it), the first switch 64 is controlled so as to select with the second switch 65 the reference block so concealed, and if there is no previously concealed block, a judgement is made with the concealment decision part 63 as to whether the data in the reference blocks of one page before or one page after the correlation is strongest, and the first switch 64 is controlled so that the reference block having the strongest correlation is selected by the second switch 65. The block thus selected with the second switch 65 is inputted to the concealment information modifier 66. In the concealment information modifier 66, a modification is performed according to necessity so as to make it possible to show the condition whether the concealment information in each block is in the block in which the respective block is concealed, and in case of the concealment, with which reference block of the page (before or after) the concealment has been made. The output of the concealment information modifier 66 is also outputted through the 1-page memory 67. In general, as in fact there are a large number of non-erroneous data in the block in which errors have been detected, it is possible to utilize the data in the block in which errors have been detected in the concealment decision part 63. By comparing the data in the block one page before from the 1-page memory 67 with the data in the block one page after to be inputted and selecting the block in which there are a large number of the close data, block having the strongest correlation can be selected. The comparison of data is performed in a similar manner to that in the concealment decision part 42 in the fifth embodiment. During the operation performed with the concealment decision part 63, the delay 68 delays the respective data in block units.

By replacing the data of the block in which the error has been detected with the data of the reference block previously concealed with said block, it becomes possible to reproduce the original data in full. By this, the probability that the blocks lying on the same position continuously for 2 pages are in a concealed state is decreased to a large extent. Accordingly, the degradation in image quality after repetition of transmitting or recording can be improved.

FIG. 5(b) is a block diagram of an error concealment part 26a in accordance with another embodiment of the present invention, in which the elements 71 and 72 are 1-page memories; element 73 is a second switch; element 74 is a concealment information modifier; element 75 is a concealment information detector; element 76 is a first switch; element 77 is a concealment decision part; element 78 is a correlation detector; elements 79 and 80 are block memories, and element 81 is a comparator. The block which has been transmitted or recorded and reproduced is first inputted to the 1-page memory 71. At this time, the signal concealed by the reference block one page before by setting the block in which an error has been detected to 'write inhibit' is written in the 1-page memory 71. This signal is further transferred to the 1-page memory 72. With respect to the block which has been judged by the concealment information detector 75 and the concealment decision part 77 that it is better to be concealed by the reference block one page after the reference block rather than the reference block one page before out of the blocks in which errors have been detected, the signal from the 1-page memory 71 is selected by using the second switch 73. Also, with respect to the block in which no error has been detected and the block which has been judged by the concealment information detector 75 and the concealment decision part 77 that it is better to be concealed by the reference block one page before, the signal from the 1-page memory 72 is selected by using the second switch 73. The concealment information detector 75 detects the concealment information in the reference block one page after that inputted to the 1-page memory 72 and the concealment information in the reference block one page before that outputted from the 1-page memory 72 with respect to the block in which error has been detected, and searches as to whether those reference blocks were previously concealed by the data of the block at present in process. Here, if it has been known by the concealment information detector 75 that there is a block previously concealed with this block (e.g. - a reference block which is either one page before or one page after it), the first switch 76 is controlled so as to select with the second switch 73 the reference block so concealed, and if there is no previously concealed block, a judgement is made with the concealment decision part 77 as to which of the data in the reference blocks of one page before or one page after has a strongest correlation, and the first switch 76 is controlled so that the reference block having the strongest correlation is selected by the second switch 73. The block thus selected with the second switch 73 is inputted to the concealment information modifier 74. In the concealment information modifier 74, a modification is performed according to necessity so as to make it possible to show the condition whether the concealment information in each block is in the block in which the respective block is concealed, and in case of the concealment, with which reference block of the page (before or after) the concealment has been made. In the concealment decision part 77, the difference of the DC coefficients of the parallelepiped which is a unit of the bit rate reduction is taken between the signal from the 1-page memory 71 and the signal to be inputted, and, based on the respective absolute values, a correlation detection operation is carried out by one block with the correlation detector 78. However, if an error has been detected with either block, the related information is written in the block memory 79. As to the operation to obtain the correlation information, a method of obtaining the average of the absolute values of the differences of the DC coefficients by one block is the simplest way. The results thereof are written in the block memory 79 by block, and transferred to the block memory 80 by page. In the comparator 81, the correlated information of the block near the block in which errors have been detected and the block near the reference block one page before it is read out from the block memory 80, and the correlated information of the block near the block in which errors have been detected and the block near the reference block one page after it is read out from the block memory 79, and the respective correlated information is subjected to an operation in consideration of the distance from the block in which the error has been detected, by which a judgement is made as to which reference block has the strongest correlation. However, as to the operation, the method of obtaining the average of the correlated information is the simplest. By this, in the same manner as in the case of the concealment decision part 54 in the sixth embodiment, it becomes possible to select the reference block of the page having the strongest correlation with the block in which the error has been detected.

On the other hand, in case of utilizing the data of all the blocks in the page in which there are the blocks in which the errors have been detected, an operation to obtain the correlated information to be carried out with the correlation detector 78 is carried out by 1 page. However, if an error has been detected in either of the blocks, the blocks are not to be used. With respect to the operation to obtain the correlated information, the method of obtaining the average of the absolute values of the difference of DC coefficients by 1 block is the simplest. And, the result of said operation is written in the block memory 79 as the correlated information and transferred to the block memory 80 by page. Here, the block memories 79 and 80 may be D-FF of a number sufficient for 1 operation result. In the comparator 81, the correlated information between the page in which the error has been detected and the page before it is read out from the block memory 80, and the correlated information between the page in which the error has been detected and the page after it is read out from the block memory 79, and judgement is made as to which reference block has the strongest correlation. This procedure can be the same as that of the concealment decision part 54 in the sixth embodiment.

In the fifth, sixth, seventh and eighth embodiments, not only can the DC coefficient of a parallelepiped be used but also the low frequency coefficient for the comparative operation. Furthermore, as a bit rate reduction method, a method other than the orthogonal transformation may be applicable. In order to simplify the apparatus, it may be possible to restrict the concealment to a method of replacing at all times with a block one page before. By this method, detection of inter-page correlation becomes unnecessary, and it may suffice for the concealment information to be always checked only one page after.

Figure 6:
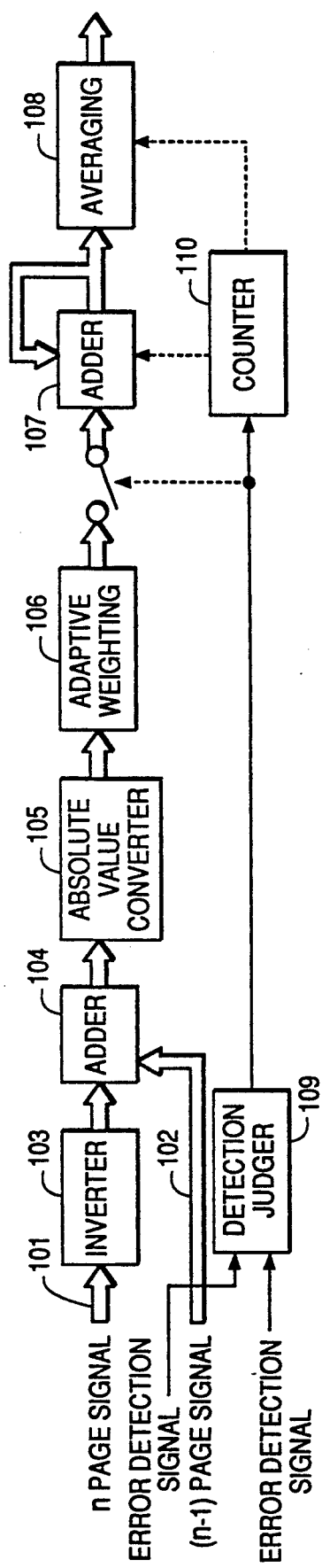
FIG. 6 is a block diagram of a correlation detector of the circuits of FIGS. 4(a) and 4(b) and FIGS. 5(a) and 5(b)

FIG. 6 is a block diagram of correlation detectors 55 and 78 in accordance with the ninth embodiment of the present invention, in which the elements 101 and 102 are signal inputs; element 103 is an inverter; elements 104 and 107 are adders, element 105 is an absolute value converter element 106 is an adaptive weighting circuit element 108 is an averaging circuit; element 109 is a detection judger, and element 110 is a counter. The signal of the n-th page is inputted from the signal input 101, and the n+1-th page is inputted from the signal input 102, and the difference between them is obtained by using the inverter 103 and adder 104, an absolute value is calculated by the absolute converter 105, and addition is carried out by using an adaptive weighting circuit 106 and adder 107. However, if an error has been detected in either the n-th page signal or the n+1-th page signal, such an error is judged by the detection judger 109 so as not to use it for addition. In case of obtaining the correlated information in the units of one block, the averaging circuit 108 is unnecessary. In case of using the correlated information in the units of one page, either the whole information in one page may be used or a suitable fixed number of sample blocks may be used out of the one page information. According to the former method, the total number of the signals to be used for addition is obtained with the counter 110, and the value normalized with the averaging circuit 108 is obtained as the correlated information. According to the latter method, judgement on the selection of the sample block is also carried out with the counter 110, by which the value obtained by controlling the addition with the adder 107 is used as the correlated information. This circuit configuration is an example. Also, the signal the n-th page and that on the n+1-th page may be inputted from either of the signal inputs 101 and 102.

Figure 7:
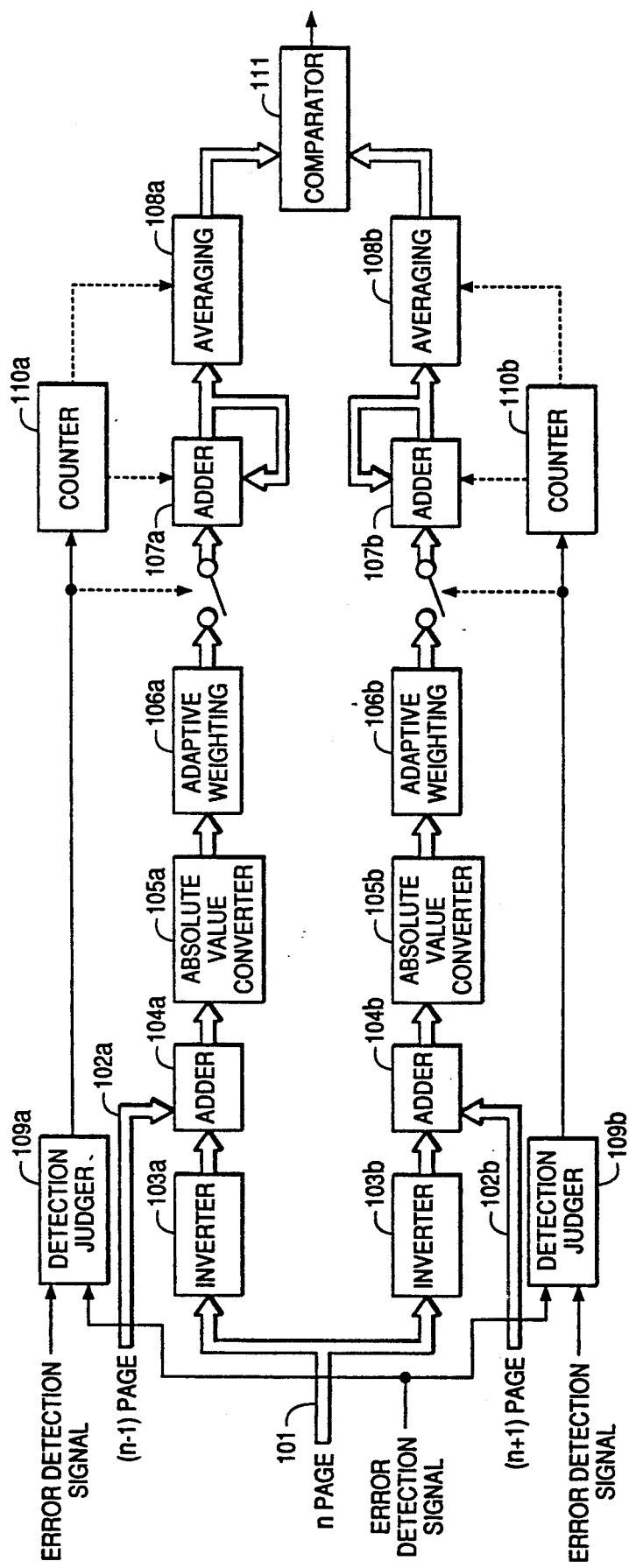
FIG. 7 is a block diagram of a concealment decision part of the circuits of FIGS. 4(a) and 4(b) and FIGS. 5(a) and 5(b).

FIG. 7 is a block diagram of concealment decision parts 42 and 63 in accordance with the tenth embodiment of the present invention, in which elements 101, 102a, and 102b are signal inputs; elements 103a and 103b are inverters; elements 104a, 104b, 107a, and 107b are adders; elements 105a and 105b are absolute value converters; elements 106a and 106b are adaptive weighting circuits; elements 108a and 108b are averaging circuits; elements 109a and 109b are detection judgers; elements 110a and 110b are counters, and element 111 is a comparator. The signal on the n-th is inputted from the signal input 101; the signal on the n-1-th page is inputted from the signal input 102a, and the signal on the n+1-th page is inputted from the signal input 102b. The correlated information of the signals between the n-th page and the n-1-th page obtained by the averaging circuit 108a is compared with the correlated information of the signals between the n-th page and the n+1-th page obtained by the averaging circuit 108b and judgement is made as to which smaller valued one has the strongest correlation. The method of obtaining the respective correlated information is the same as in the ninth embodiment.

What is claimed is:

1. A digital video signal recording and reproducing apparatus comprising:

an encoding means for subjecting an input digital video signal to a bit rate reduction encoding to obtain a first bit rate reduction encoded video signal;

a copy input means for inputting as a copy input signal a second bit rate reduction encoded video signal supplied from outside of said apparatus;

a selection means for selectively outputting either said first bit rate reduction encoded video signal or said second bit rate reduction encoded video signal;

a recording signal processing means including a modulation means for modulating a selected bit rate reduction encoded video signal from said selection means to obtain a modulated video signal;

a recording and reproducing means for recording the modulated video signal from said recording signal processing means on a recording medium and for reproducing the recorded signal from said recording medium to obtain a reproduced modulated video signal;

a demodulation means for demodulating the reproduced modulated signal to obtain a reproduced bit rate reduction encoded signal;

an error correcting and concealing means for detecting errors of the reproduced bit rate reduction encoded signal which contain correctable errors and uncorrectable errors, said error correcting and concealing means correcting said correctable errors and concealing said uncorrectable errors to obtain an encoded video signal in which the errors have been corrected or concealed;

a copy output means for outputting the encoded video signal obtained from said error correcting and concealing means as a copy output signal; and a decoding means for decoding the encoded video signal obtained from said error correcting and concealing means to obtain a reproduced digital video signal.

2. An apparatus according to claim 1, wherein said recording signal processing means includes a means for adding a specific auxiliary data to the bit rate reduction encoded video signal from aid selection means so that said auxiliary data will be recorded and reproduced together with the bit rate reduction encoded video signal, and said copy output means outputs a reproduced auxiliary data together with the encoded video signal from said error correcting means.

3. An apparatus according to claim 1, wherein said second bit rate reduction encoded video signal contains an error correcting code, and said copy input means includes a means for decoding said error correcting code.

4. An apparatus according to claim 1, wherein said copy output means includes a means for subjecting the encoded video signal to be outputted as the coy output signal to an error correcting encoding to obtain a copy output signal containing an error correcting code.

5. An apparatus according to claim 1, wherein said recording signal processing means includes a means for adding to the bit rate reduction encoded video signal from aid selection means a copy protection data indicating a copy protection condition of the bit rate reduction encoded video signal.

6. An apparatus according to claim 1, wherein said second bit rate reduction encoded video signal contains a copy protection data indicating a copy protection condition of the second bit rate reduction encoded video signal, and said recording signal processing means includes a means for changing said copy protection data.

7. A digital video signal recording and reproducing apparatus comprising:

an encoding means for dividing an input digital video signal of each page constituted by one or more fields into blocks, and subjecting the input digital video signal to a bit rate reduction encoding on a block by block basis to obtain a first bit rate reduction encoded video signal;

a copy input means for inputting as a copy input signal a second bit rate reduction encoded video signal supplied from outside of said apparatus;

a selection means for selectively outputting either said first bit rate reduction encoded video signal or said second bit rate reduction encoded video signal;

a recording signal processing means including a modulation means for modulating a selected bit rate reduction encoded video signal from said selection means to obtain a modulated video signal;

a recording and reproducing means for recording the modulated video signal from said recording signal processing means on a recording medium and for reproducing the recorded signal from said recording medium to obtain a reproduced modulated video signal;

a demodulation means for demodulating the reproduced modulated signal to obtain a reproduced bit rate reduction encoded signal;

an error correcting means for detecting and correcting errors of the reproduced bit rate reduction encoded signal to obtain an encoded video signal in which some of the errors have been corrected, wherein, when there is an error block in which an uncorrectable error has been detected and has not been corrected, said error block is included as is in the encoded video signal obtained form said error correcting means;

a reference block deciding means coupled to said error correcting means for checking correlations of a data in said error block with a data in a first reference block at a corresponding position on a previous page and a data in a second reference block which is at a corresponding position on a next page, deciding which one of the first and second reference blocks has a stronger correlation with the error block than the other, and outputting a block decision signal indicative of one of the first and second reference blocks which has the stronger correlation with the error block than the other;

a replacing means responsive to the block decision signal for replacing the error block with the reference block indicated by the block decision signal to thereby obtain an error concealed encoded video signal;

a copy output means for outputting the error concealed encoded video signal from said replacing means as a copy output signal; and a decoding means for decoding the error concealed encoded video signal from said replacing means to obtain a reproduced digital video signal.

8. An apparatus according to claim 7, wherein said reference block deciding means includes a means for presuming an interpage correlation by using the data in the error block to thereby detect the correlation between the error block and each of the first and second reference blocks.

9. An apparatus according to claim 7, wherein said reference block deciding means includes a means for presuming an interpage correlation by using the data in the error block to thereby detect the correlation between the error block and each of the first and second reference blocks.

10. An apparatus according to claim 7, wherein said reference block deciding means includes a means for checking an inter-page correlation of a block adjacent to the error block to thereby detect the correlation between the error block and each of the first and second reference blocks.

11. An apparatus according to claim 7, wherein said encoding means divides a digital video signal in each block into low frequency components and high frequency components.

12. An apparatus according to claim 11, wherein said reference block deciding means includes a means for comparing low frequency components in the error block with low frequency components in each of the first and second reference blocks to thereby detect the correlation between the error block and each of the first and second reference blocks.

13. An apparatus according to claim 11, wherein said reference block deciding means includes a means for comparing a sum of absolute values of differences between low frequency components in the error block and low frequency components in the first reference block and a sum of absolute values of difference between the low frequency components in the error block and low frequency components in the second reference block, and selecting one of the first and second reference blocks which gives a smaller value of the sums.

14. An apparatus according to claim 11, wherein said reference block deciding means includes a means for comparing low frequency components in an adjacent block which is adjacent to the error block and in which no error has been detected with low frequency components in each of a third reference block at a corresponding position on the previous page and a fourth reference block at a corresponding position on the next page to thereby detect the correlation between the error block and each of the first and second reference blocks.

15. An apparatus according to claim 11, wherein said reference block deciding means includes a means for comparing an average of absolute values of differences between low frequency components in adjacent blocks which are adjacent to the error block and in which no error has been detected and respective low frequency components in reference blocks which are at respective corresponding positions on the previous page and in which no error has been detected and an average of absolute values of differences between the low frequency components in said adjacent blocks and respective low frequency components in reference blocks which are at respective corresponding positions on the next page and in which no error has been detected, and selecting one of the first and second reference blocks which gives a smaller value of the averages.

16. An apparatus according to claim 11, wherein said reference block deciding means includes a means for comparing low frequency components in each block which is on the same page as the error block and in which no error has been detected with low frequency components in each of reference blocks which are at respective corresponding positions on the previous page and the next page and in which no error has been detected to thereby detect the correlation between the error block and each of the first and second reference blocks.

17. A digital video signal recording and reproducing apparatus comprising:

an encoding means for dividing an input digital video signal of each page constituted by one or more fields into a plurality of blocks, and subjecting the input digital video signal to a bit rate reduction encoding on a block by block basis to obtain a first bit rate reduction encoded video signal;

a recording signal processing means including a means for adding to a selected bit rate reduction encoded video signal from said selection means a concealment data indicating whether or not each block is a concealed block which has been replaced by another block and the block by which the concealed block has been replaced, and a modulation means for modulating the bit rate reduction encoded video signal added with said concealment data to obtain a modulated video signal;

a recording and reproducing means for recording the modulated video signal from said recording signal processing means on a recording medium and for reproducing the recorded signal from said recording medium to obtain a reproduced modulated video signal;

a demodulation means for demodulating the reproduced modulated signal to obtain a reproduced bit rate reduction encoded signal including a reproduced concealment data;

an error correcting means for detecting and correcting errors of the reproduced bit rate reduction encoded signal to output an encoded video signal in which some of the errors have been corrected, wherein, when there is an error block in which an uncorrectable error has been detected and has not been corrected, said error block is included as is in the output encoded video signal from said error correcting means;

a concealed block detecting means coupled to said error correcting means for detecting from said reproduced concealment data whether or not said error block is a block by which another block has been replaced and which block has been replaced by said error block, and for outputting a block detection signal indicating whether or not said error block has replaced another block and, if said error block has replaced another block, a block which has been replaced by said error block;

a reference block deciding means coupled to said error correcting means for checking correlations of a data in said error block with a data in a first reference block at a corresponding position on a next page, deciding which one of the first and second reference blocks has a stronger correlation with the error block than the other, and outputting a block decision signal indicative of one of the first and second reference blocks which has the stronger correlation with the error block than the other;

a replacing means for replacing said error block by another block to thereby obtain an error concealed encoded video signal, said replacing means comprising a first replacing means responsive to said block detection signal for replacing the error block by the block indicated by said block detection signal when the error block has replaced another block, and a second replacing means responsive to said block detection signal and said block decision signal for replacing the error block with the reference block indicated by the block decision signal when the error block has not been replaced another block;

a copy output means for outputting the error concealed encoded video signal from said replacing means as a copy output signal; and a decoding means for decoding the error concealed encoded video signal from said replacing means to obtain a reproduced digital video signal.

18. An apparatus according to claim 17, wherein said recording signal processing means including a means for initializing said concealment data when the selected bit rate reduction encoded video signal from said selection means is said first bit rate reduction encoded video signal.

19. An apparatus according to claim 17, wherein said reference block deciding means includes a means for presuming an inter-page correlation by using the data in the error block to thereby detect the correlation between the error block and each of the first and second reference blocks.

20. An apparatus according to claim 17, wherein said reference block deciding means includes a means for presuming an inter-page correlation by using the data in the error block to thereby detect the correlation between the error block and each of the first and second reference blocks.

21. An apparatus according to claim 17, wherein said reference block deciding means includes a means for checking an inter-page correlation of a block adjacent to the error block to thereby detect the correlation between the error block and each of the first and second reference blocks.

22. An apparatus according to claim 17, wherein said encoding means divides a digital video signal in each block into low frequency components and high frequency components.

23. An apparatus according to claim 22, wherein said reference bock deciding means includes a means for comparing low frequency components in the error block with low frequency components in each of the first and second reference blocks to thereby detect the correlation between the error block and each of the first and second reference blocks.

24. An apparatus according to claim 22, wherein said reference block deciding means includes a means for comparing a sum of absolute values of differences between low frequency components in the error block and low frequency components in the first reference block and a sum of absolute values of differences between the low frequency components in the error block and low frequency components in the second reference block, and selecting one of the first and second reference blocks which gives a smaller value of the sums.

25. An apparatus according to claim 22, wherein said reference block deciding means includes a means for comparing low frequency components in an adjacent block which is adjacent to the error block and in which no error has been detected with low frequency components in each of a third reference block at a corresponding position on the previous page and a fourth reference block at a corresponding position on the next page to thereby detect the correlation between the error block and each of the first and second reference blocks.

26. An apparatus according to claim 22, wherein said reference block deciding means includes a means for comparing an average of absolute values of difference between low frequency components in adjacent blocks which are adjacent to the error block and in which no error has been detected and respective low frequency components in reference blocks which are at respective corresponding positions on the previous page and in which no error has been detected and an average of absolute values of differences between the low frequency components in said adjacent blocks and respective low frequency components in reference blocks which are at respective corresponding positions on the next page and in which no error has been detected, and selecting one of the first and second reference blocks which gives a smaller value of the averages.

27. An apparatus according to claim 22, wherein said reference block deciding means includes a means for comparing low frequency components in each block which is on the same page as the error block and in which no error has been detected with low frequency components in each of reference blocks which are at respective corresponding positions on the previous page and the next page and in which no error has been detected to thereby detect the correlation between the error block and each of the first and second reference blocks.

28. A digital video signal recording and reproducing apparatus comprising:

an encoding means for subjecting an input digital video signal to a bit rate reduction encoding to obtain a bit rate reduction encoded video signal;

a recording signal processing means including a modulation means for modulating the bit rate reduction encoded video signal to obtain a modulated video signal;

a recording and reproducing means for recording the modulated video signal from said recording signal processing means on a recording medium and for reproducing the recorded signal from said recording medium to obtain a reproduced modulated video signal;

a demodulation means for demodulating the reproduced modulated signal to obtain a reproduced bit rate reduction encoded signal;

an error correcting means for detecting and correcting errors of the reproduced bit rate reduction encoded signal to obtain an error corrected encoded video signal in which an uncorrectable error has been detected but has not been corrected;

an error concealing means for concealing said uncorrectable error contained in the error corrected encoded video signal from said error correcting means to obtain an error concealed encoded video signal; and a decoding means for decoding the error concealed encoded video signal from said error concealing means to obtain a reproduced digital video signal.

29. An apparatus according to claim 28, wherein said encoding means divides an input digital video signal of each page constituted by one or more fields into blocks, and subjects the input digital video signal to a bit rate reduction encoding on a block by block basis to obtain the bit rate reduction encoded video signal, and wherein said error concealing means comprises:

a reference block deciding means coupled to said error correcting means for checking correlations of a data in an error block in which an uncorrectable error has been detected by said error correcting means with a data in a first reference block at a corresponding position on a previous page and a data in a second reference block which is at a corresponding position on a next page, deciding which one of the first and second reference blocks has a stronger correlation with the error block than the other, and outputting a block decision signal indicative of one of the first and second reference blocks which has the stronger correlation with the error block than the other; and a replacing means responsive to the block decision signal for replacing the error block with the reference block indicated by the block decision signal to thereby obtain an error concealed encoded video signal.

30. An apparatus according to claim 28, wherein said encoding means divides an input digital video signal of each page constituted by one or more fields into blocks, and subjects the input digital video signal to a bit rate reduction encoding on a block by block basis to obtain the bit rate reduction encoded video signal, wherein said recording signal processing means includes a means for adding to the bit rate reduction encoded video signal a concealment data indicating whether or not each block is a concealed block which has been replaced by another block and the block by which the concealed block has been replaced, wherein, when there is an error block in which an uncorrectable error has been detected and has not been corrected by said error correcting means, said error block is included as is in the error corrected encoded video signal from said error correcting means, and wherein said error concealing means comprises:

a concealed block detecting means coupled to said error correcting means for detecting from a reproduced concealment data whether or not said error block is a block by which another block has been replaced and which block has been replaced by said error block, and for outputting a block detection signal indicating whether or not said error block has replaced another block and, if said error block has replaced another block, a block which has been replaced by said error block;

a reference block deciding means coupled to said error correcting means for checking correlations of a data in said error block with a data in a first reference block at a corresponding position on a previous page and a data in a second reference block which is at a corresponding position on a next page, deciding which one of the first and second reference blocks has a stronger correlation with the error block than the other, and outputting a block decision signal indicative of one of the first and second reference blocks which has the stronger correlation with the error block than the other; and a replacing means for replacing said error block by another block to thereby obtain an error concealed encoded video signal, said replacing means comprising a first replacing means responsive to said block detection signal for replacing the error block by the block indicated by said block detection signal when the error block has replaced another block, and a second replacing means responsive to said block detection signal and said block decision signal for replacing the error block with the reference block indicated by the block decision signal when the error block has not been replaced another block.

* * * * *